March 24, 1959 A. LEBLOND 2,879,437
DELAY LINES FOR HIGH POWER DISCHARGE TUBES
Filed May 23, 1955 5 Sheets-Sheet 1
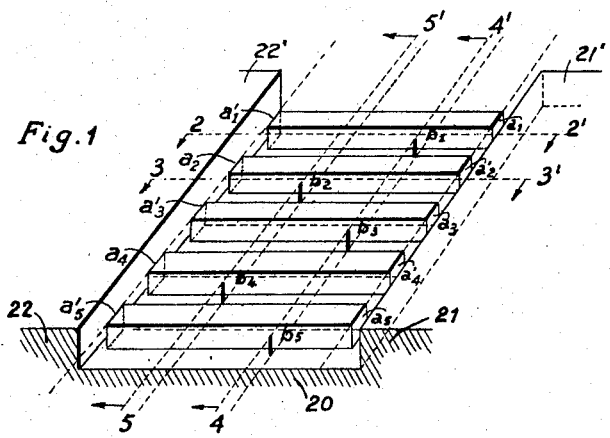
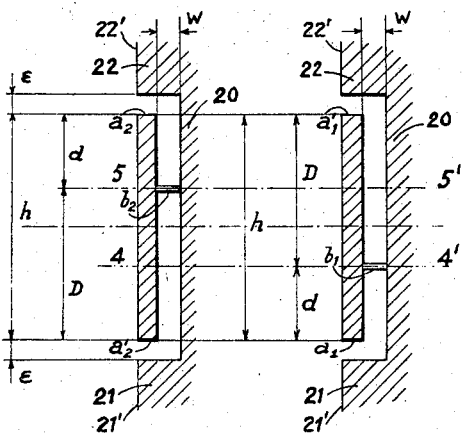
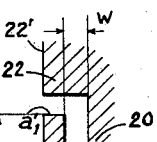
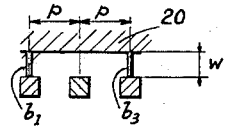
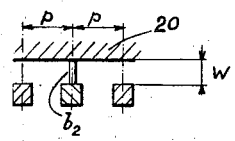
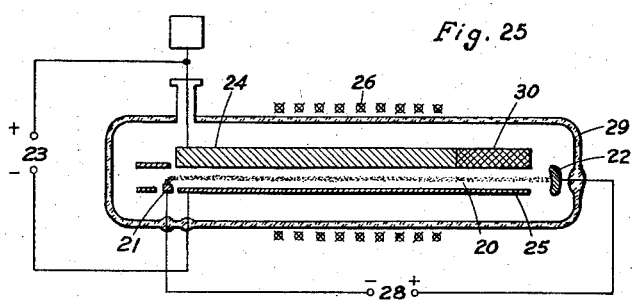

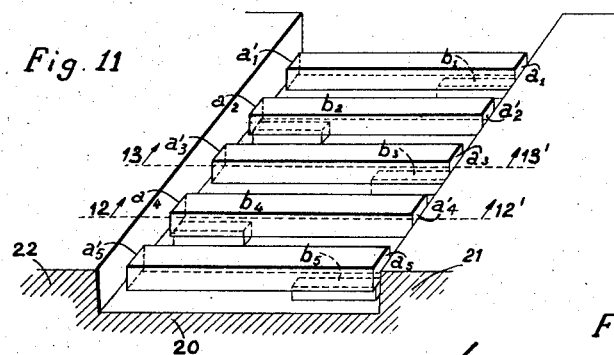
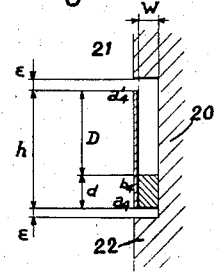
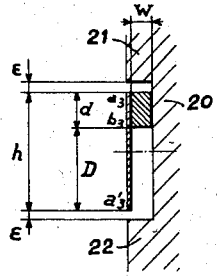
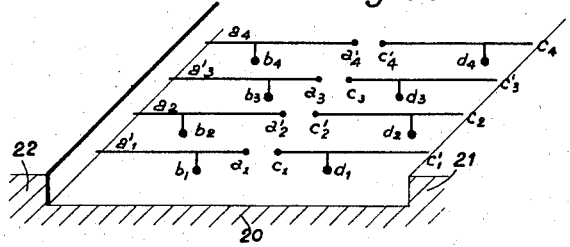
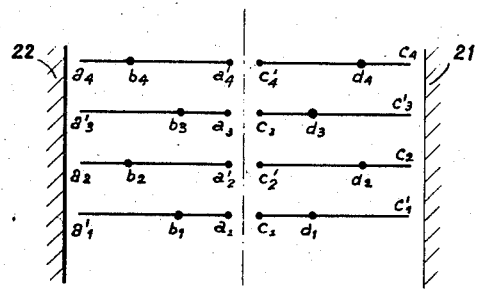
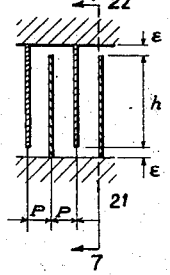
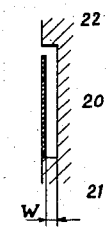

United States Patent Office 2,879,437
Patented Mar. 24, 1959

2,879,437

DELAY LINES FOR HIGH POWER DISCHARGE TUBES

André Leblond, Paris, France, assignor to Compagnie Generale de Telegraphie Sans Fil, a corporation of France Application May 23, 1955, Serial No. 510,244

Claims priority, application France May 29, 1954

8 Claims. (Cl. 315—3.5)

The present invention relates to a new back-plate type delay line intended for use in electron tubes wherein a prolonged interaction occurs between an electromagnetic wave and an electron stream, such as tubes of the forward or backward traveling wave type and of the "magnetron" type.

It is known that these types of tube can be constructed with various forms of delay lines, in particular delay lines of the type known as interdigital, with or without a back-plate as the case may be, such as are disclosed in copending U.S. patent applications Ser. No. 275,928 filed April 11, 1952, and Ser. Nos. 282,761, now Patent 2,770,780, and 282,762, now Patent 2,827,588, filed April 17, 1952.

The principal object of the present invention is to provide a form of back-plate delay line which would be particularly useful in tubes with high current electron beams and therefore of high output.

In order to increase the high frequency power generated, or amplified, in a given frequency band by an electron tube utilising an interdigital line of the type described in the above-mentioned patent applications, one possibility is to increase the length of the fingers constituting the interdigital combs of the line so as to provide interaction of the wave with a wider beam. But this modification of the length of the fingers lowers the frequencies of the band over which the tube can operate.

In order to avoid such shifting of the frequency band, it is known from the prior art, to modify other line parameters, for example, the dimensions of the cross-section of these fingers. Now it is not always possible, or convenient, to modify these dimensions.

With the delay line of the present invention this difficulty is resolved. This line will provide a higher output than similar delay lines of the prior art, having the same fingers of same dimensions.

On the other hand, the delay line according to the present invention when incorporated in an electron tube will, for an equal high frequency power delivered, allow the operation in a band of frequencies higher than obtained in the case of a conventional interdigital line.

This new form of back-plate delay line is essentially distinguished from conventional back-plate delay lines by the manner of supporting the fingers of the line.

This line comprises a series of parallel fingers mounted parallel to a back-plate to which they are respectively attached at a point of the fingers comprised between the plane of symmetry of the row of fingers and one of the ends.

According to another embodiment of the invention the fingers are secured throughout the length comprised between this latter point and their end nearest thereto. The distance from the fixing point to one of the ends of the corresponding finger is the same for every alternate finger. It passes from the value $d$ to the value $h-d$ from one finger to the next, $h$ being the length common to all fingers of the line and $d$ the distance between the fixing point and the nearest end of a finger.

According to another characteristic of the invention, by assembling several lines in parallel juxtaposition with or without interconnection therebetween, a composite line is obtained whose operating band of frequencies is the same as that of each basic component of the composite line, and which enables considerable high frequency power to be obtained.

Other features of the invention will be made apparent by the following description with reference to the appended drawing wherein like reference numbers designate similar parts. In this drawing, Fig. 1 shows a perspective view of a first embodiment of a line in accordance with the invention;

Figs. 2 to 5 show sectional views of this line, through the planes 2—2', 3—3', 4—4', 5—5' of Fig. 1;

Figs. 6 and 7 show schematically a conventional back-plate interdigital line, respectively in plan and in section on line 7—7' of Fig. 6;

Fig. 11 shows a general perspective view of a second embodiment of a line in accordance with the invention;

Figure 16:
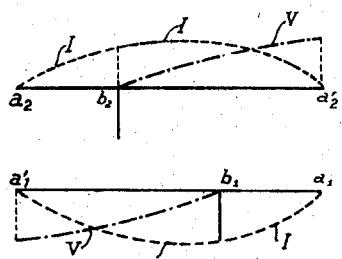
Figure 17:
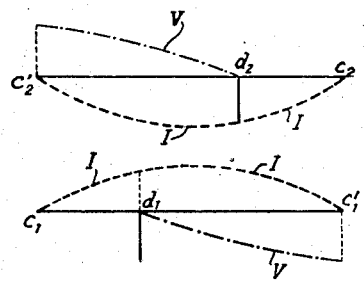
Figure 18:
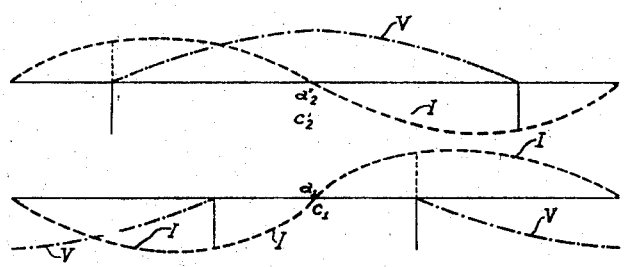
Figure 21:
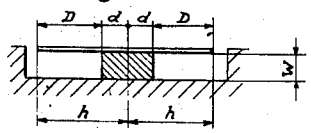
Figure 20:
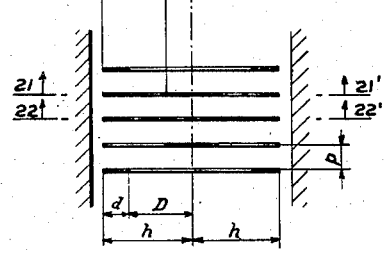
Figure 22:
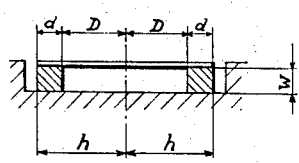
Figure 19:
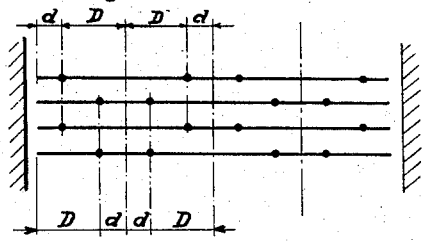
Figure 23:
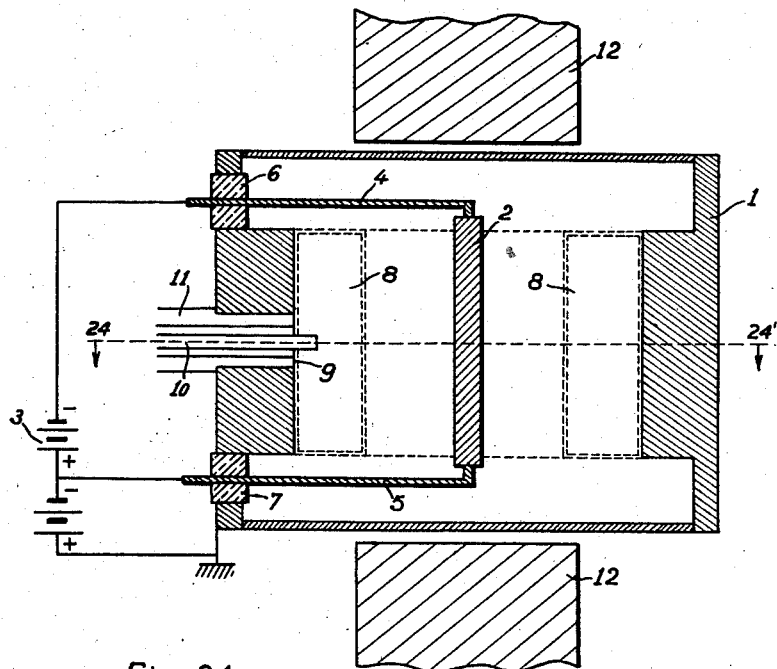
Figure 24:
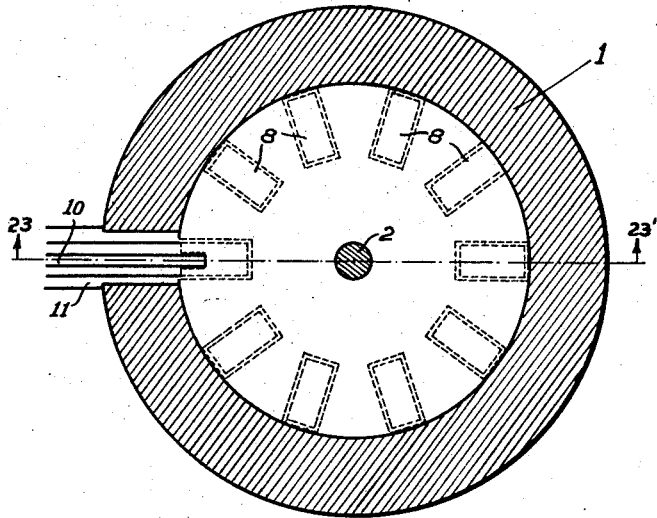

Figs. 12 and 13 show sectional views of this line taken along planes 12—12' and 13—13' of Figure 11;

Figs. 14 and 15 schematically show the first in perspective, the second from above, a delay line produced by placing side by side two lines of the first embodiment;

Figs. 16, 17 and 18 show the current and voltage distribution of the elements of the two lines of Figures 14 and 15;

Fig. 19 schematically shows a modified embodiment of Figures 14 and 15;

Fig. 20 shows the paralleling of two lines according to the invention, schematically shown, and conforming to the second embodiment;

Figs. 21 and 22 are sections of the assembly of Figure 20 taken on lines 21—21' and 22—22' of Figure 20;

Figs. 23 and 24 are an axial and a cross section taken on lines 23—23' and 24—24', respectively, of the alternate figure and showing a magnetron fitted with a delay line according to the invention; and Fig. 25 shows an axial section of a backward wave oscillator comprising a delay line according to the invention.

The delay line portion shown in Figure 1 comprises five equal oblong metal fingers $a_1 a_1'$, $a_2 a_2'$, ... $a_5 a_5'$ mounted parallel to a plane metal back-plate 20. The latter has two rectangular shoulders 21 and 22 whose faces 21' and 22', parallel to the back-plate, are in the prolongation of the external wide faces of the fingers, as shown in Figures 2 and 3. According to the invention the fingers are supported on small metal rods $b_1$, $b_2$ ... $b_5$ which secure them to the back-plate. In Fig. 1, these rods although they cannot be seen, have been shown in full lines for the sake of clarity. The length of these fixing rods is designated by W; the distance from each end face of the finger to the nearest shoulder is designated by $\epsilon$ (Figures 2 and 3); the respective distances between the point of contact between each finger and its supporting rod and the two end faces of the finger are designated by $d$ and D. The respective fixing points of the fingers of the delay line according to the delay line according to the invention are alternately $d+\epsilon$ and $D+\epsilon$ distant from the same shoulder 21 or 22.

In the example shown $$d = \frac{h}{3}$$

and $$D = \frac{2h}{3}$$

$h$ being the common length of the bars or fingers. The values:

$$d = \frac{h}{3}$$

and $$D = \frac{2h}{3}$$

are given by way of example only. The value chosen for $d$, and consequently for $D$, is not critical. The behaviour of the line, when parameters $d$ and $D$ are varied will be considered later. It should be noted that $d$ must be made different from zero and from $h/2$, but may take any value comprised between those two values. The pitch, i.e. the distance separating the longitudinal planes of symmetry of two successive fingers, is designated by $p$ (Figures 4 and 5) and $\psi$ designates the phase shift of the wave propagated in the delay line after travelling a length $p$ along the line or a unity phase shift.

Figs. 6 and 7 schematically show on a reduced scale a conventional back-plate interdigital line. It will be seen that the essential difference between the conventional back-plate interdigital line and the line according to the present invention lies in the manner of fixing the fingers.

Parameter $h$ shown in Figure 6 will, like that in Figure 3, be later designated as the length of the fingers. It corresponds to the interaction width of the beam and of the wave propagated along the line.

It is well known that, in a back-plate line of the type shown in Figures 6 and 7, for a given cross section of the fingers and a given operating band of frequencies, the length of the fingers must not exceed the value $$h_0 = \frac{\lambda}{4}$$

wherein $\lambda$ is the main wave length of the band. The high frequency power generated or amplified by a tube using such a line cannot, therefore, exceed a certain value since it depends on $h_0$. Now, applicant has found that in the line according to the invention finger lengths up to $$3\frac{h_0}{2}$$

may be used. Consequently in an electron tube, for an equal operating frequency band and an equal finger cross section, a line according to the invention will present to the beam a greater interaction width and will therefore enable greater high frequency powers to be generated than is the case for the conventional back-plate line of Figures 6 and 7. It is clear that one could, by means of a line in accordance with the invention be content to obtain the same power as with the conventional line, shown in Figures 6 and 7, by making $h=h_0$; a shift of the operating frequency band towards higher frequencies would result.

Figure 8:
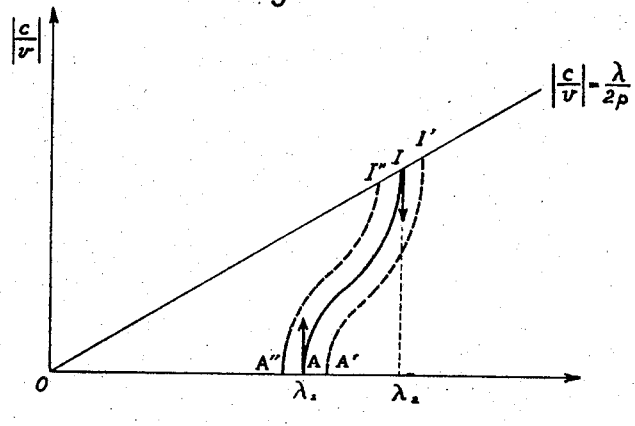
Figs. 8, 9 and 10 illustrate curves showing the operation of the line of Figure 1.
Figure 9:
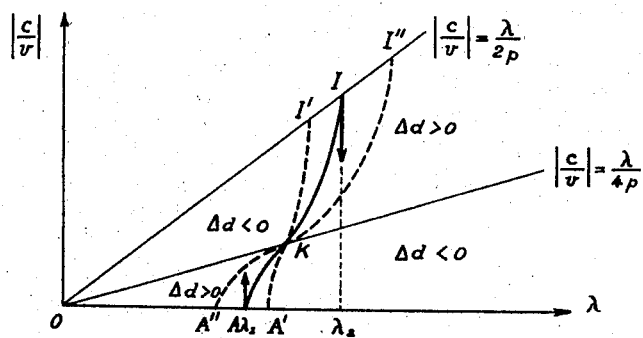
Figure 10:
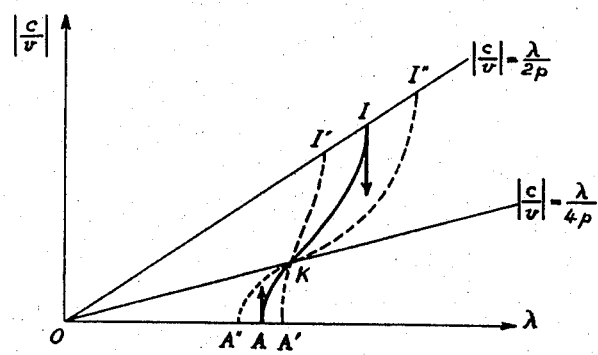

A study of the behaviour of the line according to the invention brings out the importance of the three parameters D, $d$ and S (finger cross section). The dispersion curves of Figures 8, 9, 10 summarize in turn the modifications, for the dispersion curve of the line of Figures 1 to 5, of a variation of each of these three parameters, the other two remaining unchanged. It is well known that a dispersion curve gives the value of the ratio $$\frac{c}{|v|}$$

of the velocity of light to the absolute value of the velocity of propagation of the space harmonics as a function of the wavelength in free space.

(a) D is assumed to be variable, $d$ and S being fixed (Figure 8). When D increases, the vertical tangent points A and I of the curve, corresponding to the cut-off wavelengths $\lambda_1$ and $\lambda_2$ of the line, shift respectively along the lines OA and OI, while moving away from the origin. As a first approximation the curve undergoes a shift towards the right to position A'I' shown in dotted lines. When D decreases, points A and I move towards the origin by sliding respectively along the lines OA and OI. The curve shifts as a whole towards the left to position A"I" shown in dotted lines. This result is the same as that obtained for a conventional back-plate interdigital line when $h$ is made to vary.

(b) $d$ is assumed to be variable, D and S being fixed. In this case it is found that, whatever the variations of $d$, a point on the dispersion curve remains fixed. It is that point which is located at the intersection of that curve with the straight line of the equation $$\frac{c}{v} = \frac{\lambda}{2p} \cdot \frac{\psi}{\pi}$$

It is point K of Figure 9, in which $\psi$ is equal to $\pi/2$. When $d$ varies the dispersion curve rotates about this point. If $d$ increases, a curve A'I' is obtained corresponding to a decrease in the operating band-width of the arrangement. If $d$ decreases, a curve A"I" is obtained corresponding to an increase in the operating band-width of the arrangement.

(c) S is assumed to be variable, D and $d$ being fixed. The result is similar to that of case (b) above. When the cross section varies, the dispersion curve again rotates about the same pivotal point K. Writing $r$ for the ratio $$\frac{2\gamma'}{\gamma}$$

$2\gamma'$ being the modulus of the mutual capacity of the cross section of a finger with respect to the two fingers on either side, $\gamma$ being the total capacity of the cross section of a finger with respect to the whole of the other cross-sections of the fingers and back-plate, when $r$ increases, the cut-off wavelengths $\lambda_1$ and $\lambda_2$ close in towards each other and there results a decrease of the operating band-width shown by curve A'I' of Figure 10. When $r$ decreases, the cut-off wavelengths move apart: there results an increase of the operating band-width shown by curve A"I".

By operating on the parameters of the line as described above, a line can be devised having a predetermined dispersion curve.

Figures 11 to 13 show a second embodiment of a back-plate delay line according to the invention. The difference between the line depicted in Figures 1–5 and that depicted in Figures 11–13 lies in the fact that in the latter case each finger is supported on the back-plate 20 by means of a support $a_1b_1$, $a_2b_2$, ... $a_5b_5$ which extends over the whole of part $d$ of each finger, and has the effect of short-circuiting the corresponding parts of each finger of Figure 1. Instead of being in the form of a metal rod each support is a rectangular oblong of height W, length $d$ and a width which can be the width of a finger.

It is found that a line is thus obtained having the same advantages as the former one compared to the conventional interdigital line; moreover, the wide fixing supports of its elements to the back-plate facilitate the flow of heat and at the same time provide a more rigid fixing which reduces the possibility of variation of the geometry of the fingers when in operation. Thus, the tube employing this variant of line is more constant in performance.

The behaviour of this line is similar in every way to that of Figures 1 to 5. The results summarized in the curve of Figures 8 to 10 are also valid for this second embodiment of line.

Figures 14 and 15 show a composite delay line produced by placing side by side two component lines of the first embodiment: a first component line built up of fingers $a_1a_1'$, $a_2a_2'$ ... $a_4a_4'$ supported by rods $b_1$ ... $b_4$ and a second component line built up of fingers $c_1c_1'$, $c_2c_2'$ ... $c_4c_4'$ supported on rods $d_1$ ... $d_4$; the respective fingers of the two component lines with the same index figure are in line with one another. Their respective supporting rods are so placed as to position these two component lines symmetrically with respect to the longitudinal plane of symmetry of the back-plate. The other references define the same elements as in Figures 1 and 11.

It can also be shown by assuming that distance $a_1c_1$ is very small compared to the length $h$ of the fingers, that the operation of this composite line is similar to that of the line depicted in Figures 1 and 5.

The possibility of paralleling two lines, such as those depicted in Figures 14 and 15, can be explained by means of Figures 16, 17 and 18; Figure 16 shows two successive fingers $a_1a_1'$ and $a_2a_2'$ of a first line; Figure 17 shows two successive fingers $c_1c_1'$ and $c_2c_2'$ of a second line.

Figure 18 shows the result of the juxtaposition of fingers $a_1a_1'$ and $c_1c_1'$, on the one hand, $a_2a_2'$ and $c_2c_2'$ on the other hand.

Figures 16, 17 and 18 also show the current and voltage distribution on the fingers of the two lines of Figures 13 and 14. This distribution has been found to be as follows:

(1) Voltages V, in absolute value, are equal at the ends of fingers $a_1, a_2, a_3, a_4 \ldots$; they are also equal in absolute value at the ends $a_1', a_2' \ldots a_4'$ but, in either case, there is a phase shift from one finger to the next by a constant angle which is a function of a certain phase shift $\psi$, this being the unit phase shift defined above.

(2) The currents I circulating in the various line fingers are zero at all ends, and shifted in phase by an angle $\psi$ from one finger to the next.

It will be noted that the presentations of Fgures 15, 16 and 17 regarding potentials $c_2$ are valid only in one of the following cases:

(1) By assuming that the currents and voltages of two successive fingers are represented at the respective times $t$ and $t+\Delta t$, where $\Delta t$ is the propagation time of the beam from one finger to the next.

(2) By assuming the same instant of time and a unity phase shift $\psi$ equal to $\pi$.

It is thus seen that the juxtaposition of the lines of Figures 16 and 17 takes place without any perturbation of the current or voltage distribution along the lines.

The two lines thus operate in parallel and the dispersion curve of the new arrangement is the same as that of each of the component lines, assumed to be identical.

By this means a composite line is obtained in which the interaction width is double that of each component line and which has the same advantages as the component lines.

Points $a_1$ and $c_1$, on the one hand, and $a_2'$ and $c_2'$, on the other hand, can be welded or brazed together as shown in Figure 18. Also, the two lines may be simply placed side by side as shown in Figures 14 and 15, provided only that the distance $a_1c_1$ between similar points shall be small compared with the length $h$ of the fingers.

It is clear that the operation described above may be repeated a number of times while observing the rules of symmetry already specified. By this means the variant of Figure 19 is obtained in which four basic lines of the first type are paralleled, the dots showing the position of supports fixing the fingers to the back-plate.

This can provide an interaction width between the electron beam and the electromagnetic wave as great as desired, such width being limited only by the dimensions of the tube.

Following the same principles and with the same advantages, the line of the second embodiment may be used. This provides the arrangement of Figure 20 which shows from above a line obtained by paralleling two basic lines of the second embodiment. Figures 21 and 22 are sections of Figure 20 through planes perpendicular to the plane of Figure 20, the traces of which are respectively 21—21' and 22—22'.

The lines of Figures 20, 21, 22 have considerable mechanical rigidity and facilitate the dissipation of heat, thus making them particularly convenient for high power tubes.

A delay line according to the invention can be incorporated for example, in a magnetron, as shown in Figure 23 in section through a plane 23—23' of Figure 24 containing the axis of this tube, and in Figure 24 in section along the line 24—24' of Figure 23 through a plane perpendicular to that of this figure. The cathode 2 is arranged on the axis of revolution of the cylinder forming the anode 1 of the magnetron, the length of the emitting part of this cathode 2 being substantially equal to the length of the fingers. The heating current is fed from a source 3 to this cathode 2 through conductors 4 and 5 passing through the anode 1 of the magnetron through apertures 6 and 7 closed by ceramic plugs. The fingers of a delay line according to the invention may be located within the rectangles 8, the cylinder 1 constituting the back-plate of the delay line. An opening is provided at 9 in the magnetron envelope to allow the passage of a coaxial conductor for extracting high frequency energy from the magnetron. Internal conductor 10 of said coaxial conductor is welded to a finger of the line and its external conductor 11 exactly fits the shape of opening 9. The magnetic field necessary for the operation of the tube and directed along the axis of the latter is supplied by a magnet or an electromagnet, with pole pieces 12. For a magnetron operating on a wave-band centered on the wavelength $\lambda$, and equipped with a conventional back-plate interdigital line, the useful width of the interaction space can only be close to $\lambda/4$. However, in the case of a magnetron equipped with a line according to the invention and resulting from the paralleling of K identical basic lines, with supporting rods arranged, for example, respectively at ⅓ and ⅔ of the length of the fingers, the useful width of this space becomes equal, for example, to $\lambda/4.3/2.K$. This improves the interaction with the beam. The tube is therefore capable of delivering more power. In the same way, it can operate on the same power at higher frequencies.

Fig. 25 shows in longitudinal section a backward wave oscillator provided with a delay line according to the invention. This oscillator is described in the copending U.S. patent application Ser. No. 281,347, filed April 9, 1952, in the name of B. Epsztein. There is accordingly no need to describe the structure or the operation of this oscillator in detail. It will only be reminded here that in this oscillator, as shown in Fig. 25, an electron beam 33, provided by a cathode 31, is propagated along a delay line 24, toward a collector 32. The energy propagates in a direction opposite to the direction of the beam 33. An attenuation 30 is provided in the electric field of the delay line 24, at the collector end thereof and the output connection of the tube is in the vicinity of the cathode.

In the embodiment shown the beam propagates normally to crossed magnetic and electric fields. The latter is provided by a source 23 connected across the delay line 24 and an electrode 25. The magnetic field is diagrammatically shown at 26.

As described in the above-mentioned patent application according to another embodiment no crossed magnetic and electric fields are provided. In both embodiments of this backward wave oscillator a delay line according to this invention may be used with all the above described advantages.

What is claimed is:

1. A delay line for ultra-high frequency waves comprising a conductive body having a surface elongated in a predetermined direction, at least one row of parallel conductive fingers extending parallel to said surface and perpendicular to said direction and having a common length, a plurality of metallic members secured to said surface, each finger being supported by a metallic member of said plurality, each of said fingers having a first end, a second end, and a fastening point for said finger on said metallic member intermediate said ends, the distance comprised between said first end and said fastening point being equal in successive fingers alternately to a predetermined length and to the difference between said common and predetermined lengths, the dimension of said members in the direction of said fingers being comprised between a very small value and said predetermined length.

2. A delay line according to claim 1, wherein each of said members is a rod having a very small thickness, said rod being perpendicular to said finger and to said surface.

3. A delay line according to claim 1, wherein each of said members extends in attached relationship with said finger lengthwise of the portion thereof comprised alternately between said first end and the point at a distance therefrom equal to said predetermined length and between the point at a distance therefrom equal to said difference and said second end in successive fingers.

4. A delay line for ultra-high frequency waves comprising a conductive back-plate having an offset portion forming two parallel shoulders in said plate and having a flat bottom, at least one row of parallel elongated conductive fingers positioned within said offset portion, parallel to said bottom uniformly spaced from said shoulders and having two ends, a support for supporting each finger in spaced relationship with said plate, alternately positioned between one of said ends of said fingers and the symmetry plane of said row of fingers, the distance between said bottom and said fingers being at most equal to the longest among the wavelengths of said waves, the supports of alternate fingers being parallel to each other.

5. A delay line according to claim 4 wherein said supports are rods.

6. A delay line according to claim 4 wherein said supports are constituted by blocks extending from said ends to a point distant less than the half of said finger length from said ends.

7. A delay line according to claim 4 comprising a plurality of parallel similar rows of fingers.

8. In a traveling wave tube of the type comprising a delay line for ultra-high frequency waves, a cathode positioned at one end of said delay line and output means coupled to one of the ends of said line: a delay line comprising a conductive back-plate having an offset portion forming two parallel shoulders in said plate and having a flat bottom, at least one row of parallel elongated conductive fingers positioned within said offset portion, parallel to said bottom uniformly spaced from said shoulders and having two ends, a support for supporting each finger in spaced relationship with said plate, alternately positioned between one of said ends of said fingers and the symmetry plane of said row of fingers, the distance between said bottom and said fingers being at most equal to the longest among the wavelengths of said waves, the supports of alternate fingers being parallel to each other.

References Cited in the file of this patent
UNITED STATES PATENTS
2,607,904    Lerbs ------------------ Aug. 19, 1952